United States Patent
Klamer et al.

(10) Patent No.: US 8,904,466 B2
(45) Date of Patent: *Dec. 2, 2014

(54) DIGITAL MEDIA DISTRIBUTION DEVICE

(71) Applicant: Warner Bros. Entertainment Inc., Burbank, CA (US)

(72) Inventors: Paul Klamer, La Canada, CA (US); Ken Long, Los Angeles, CA (US); Arjun Ramamurthy, Glendale, CA (US)

(73) Assignee: Warner Bros. Entertainment, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/144,462

(22) Filed: Dec. 30, 2013

(65) Prior Publication Data

US 2014/0115645 A1    Apr. 24, 2014

Related U.S. Application Data

(63) Continuation of application No. 10/916,330, filed on Aug. 10, 2004, now Pat. No. 8,621,542.

(60) Provisional application No. 60/494,396, filed on Aug. 11, 2003.

(51) Int. Cl.
| | | |
|---|---|---|
| *H04N 7/173* | (2011.01) | |
| *H04N 7/16* | (2011.01) | |
| *G06F 15/16* | (2006.01) | |
| *H04L 12/50* | (2006.01) | |
| *H04Q 11/00* | (2006.01) | |
| *H04N 19/40* | (2014.01) | |
| *H04N 21/61* | (2011.01) | |
| *H04N 21/60* | (2011.01) | |
| *H04N 19/46* | (2014.01) | |
| *H04N 21/2343* | (2011.01) | |
| *H04N 21/233* | (2011.01) | |
| *H04N 21/231* | (2011.01) | |

(52) U.S. Cl.
CPC ..... *H04N 19/00472* (2013.01); *H04N 21/6125* (2013.01); *H04N 21/60* (2013.01); *H04N 19/00545* (2013.01); *H04N 21/234309* (2013.01); *H04N 21/2335* (2013.01); *H04N 21/231* (2013.01)
USPC ........... 725/118; 725/131; 725/133; 725/139; 725/141; 725/151; 709/201; 709/217; 709/250; 370/386

(58) Field of Classification Search
None
See application file for complete search history.

(56) References Cited

U.S. PATENT DOCUMENTS 5,790,556 A * 8/1998 Matsumoto .................. 370/527
5,818,512 A * 10/1998 Fuller ............................ 725/82

(Continued)

OTHER PUBLICATIONS

European Office Action Dated Jul. 17, 2009, Re Application No. 04 780 741.7-1522. p. 1-3.

(Continued)

*Primary Examiner* — Mushfikh Alam
(74) *Attorney, Agent, or Firm* — Jonathan Jaech; Snell & Wilmer L.L.P.

(57) ABSTRACT

A digital media distribution device that includes an encoder, a decoder coupled to the encoder, and a transcoder coupled to the decoder. The encoder is configured to encode input data that is received by the digital media distribution device into a first data format. The decoder is configured to decode output data to be output by the digital media distribution device. The transcoder is configured to convert the encoded input data from the first data format into a second data format. The digital media distribution device is configured to be coupled to a computer network.

20 Claims, 1 Drawing Sheet

(56) References Cited

U.S. PATENT DOCUMENTS

| | | | |
|---|---|---|---|
| 6,014,694 | A | 1/2000 | Aharoni et al. |
| 6,288,738 | B1 | 9/2001 | Dureau et al. |
| 6,768,519 | B2 | 7/2004 | Fujita et al. |
| 7,117,156 | B1* | 10/2006 | Kapilow ................ 704/267 |
| 7,143,432 | B1 | 11/2006 | Brooks et al. |
| 7,266,611 | B2 | 9/2007 | Jabri et al. |
| 7,391,808 | B1* | 6/2008 | Farrand ................ 375/240.12 |
| 2002/0007494 | A1 | 1/2002 | Hodge |
| 2002/0028024 | A1 | 3/2002 | Jayant et al. |
| 2002/0028670 | A1* | 3/2002 | Ohsuge ................ 455/413 |
| 2002/0092030 | A1 | 7/2002 | Gu |
| 2002/0196762 | A1 | 12/2002 | Choi et al. |
| 2003/0066084 | A1 | 4/2003 | Kaars |
| 2003/0128301 | A1 | 7/2003 | Tarr et al. |
| 2003/0154480 | A1 | 8/2003 | Goldthwaite et al. |
| 2003/0177255 | A1 | 9/2003 | Yun |
| 2003/0185301 | A1 | 10/2003 | Abrams et al. |
| 2003/0233663 | A1 | 12/2003 | Rao et al. |
| 2004/0055016 | A1 | 3/2004 | Anipindi et al. |
| 2004/0237104 | A1 | 11/2004 | Cooper et al. |
| 2004/0246376 | A1 | 12/2004 | Sekiguchi et al. |
| 2004/0261113 | A1 | 12/2004 | Paul et al. |
| 2004/0264938 | A1 | 12/2004 | Felder |
| 2005/0044186 | A1 | 2/2005 | Petrisor |
| 2005/0144284 | A1* | 6/2005 | Ludwig et al. ................ 709/226 |
| 2006/0218611 | A1 | 9/2006 | Son et al. |
| 2007/0049306 | A1* | 3/2007 | Sekino et al. ................ 455/502 |
| 2009/0262741 | A1 | 10/2009 | Jungck et al. |

OTHER PUBLICATIONS

Anonymous, "Video Raptor," [Online] 2002, XP002307593, Retrieved from the Internet: URL:http://www.tiesseci.com/English/vr5000 engweb.pdf>;[retrieved on Nov. 24, 2004].

Anonymous, "One Source, Multi Use for Content Distribution in the Broadcast Era," Solution Blueprint Digital Media, [Online] 2002, XP002307594 Retrieved from the Internet: URL:http://www.intel.com/business/bss/solutions/blueprints/pdf/isiddmam0235.pdf>;[retrieved].

Anonymous, "FlipFactory," [Online] Mar. 2003, XP002307595 Retrieved from the Internet: URL:http://www.search/globalspec.com/goto/PDFViewer?pdfURL=http%3A%2F%2Fwww%2Evse%2Eut%2Fakkegatu%2FFF%5Fori%2Eodf>;[retrieved].

Summons to attend oral proceedings pursuant to Rule 115(1) EPC dated Aug. 18, 2014 for EP04780741.7.

\* cited by examiner

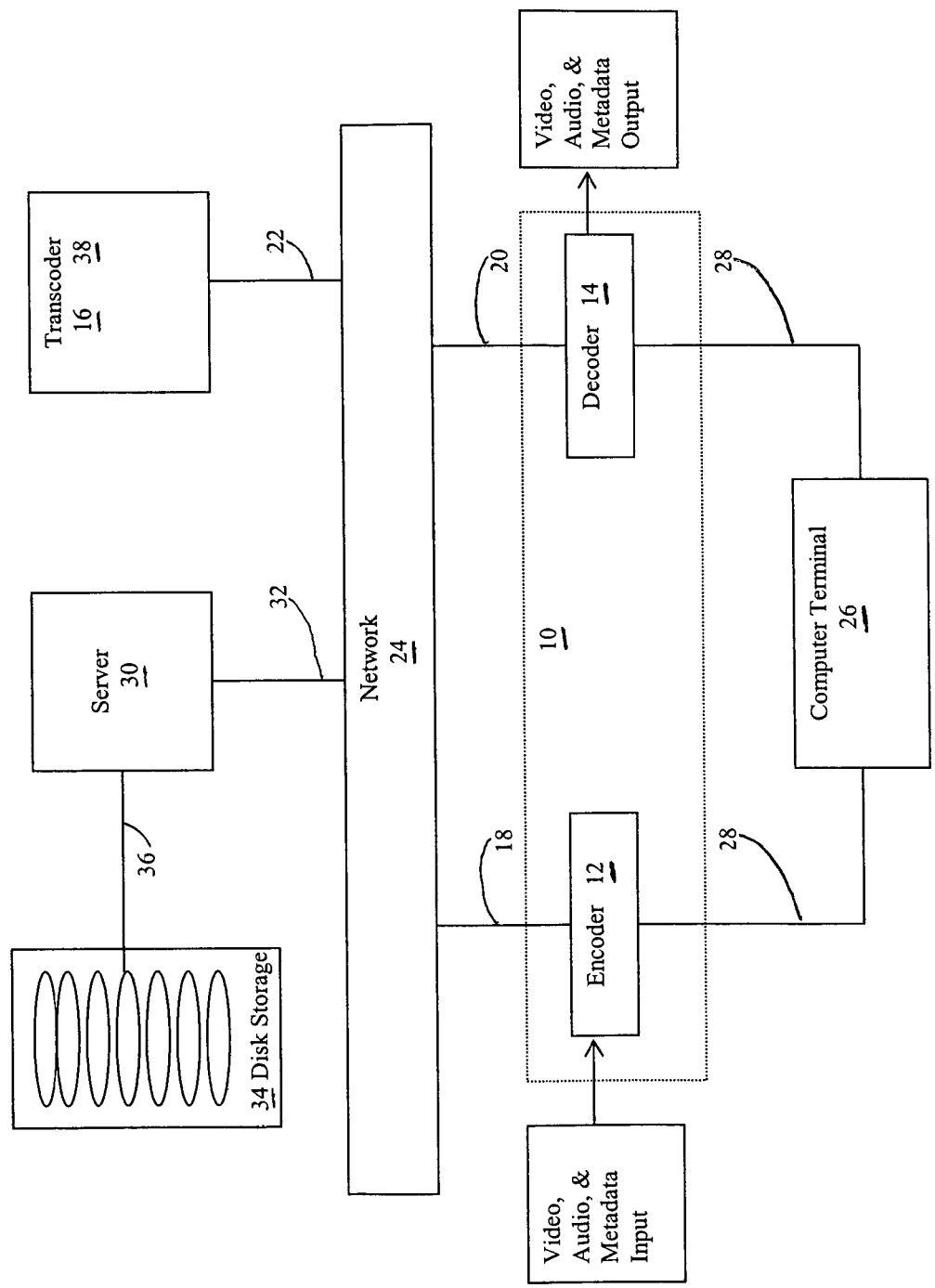

US 8,904,466 B2

DIGITAL MEDIA DISTRIBUTION DEVICE

CROSS-REFERENCE TO RELATED APPLICATION

This application is a continuation of U.S. application Ser. No. 10/916,330 filed Aug. 10, 2004, now U.S. Pat. No. 8,621, 542, which claims priority under 35 U.S.C. §119(e) to U.S. Provisional Patent Application No. 60/494,396, filed on Aug. 11, 2003, entitled "Digital Media Distribution Device," by Paul Klamer, Ken Long, and Arjun Ramamurthy, which applications are incorporated by reference herein.

BACKGROUND OF THE INVENTION

1. Field of the Invention

The invention relates generally to the field of data manipulation and storage. More specifically, the invention relates to devices that manipulate and store image, sound, and associated metadata.

2. Description of Related Art

In the entertainment industry, the video tape recorder ("VTR") has served for many years as the main device for storing video and accompanying audio. However, there is a need for an apparatus that provides capabilities beyond those offered by the VTR. In particular, there is a need for an apparatus that can store data on network-accessible mass storage devices, e.g., disk drives. Additionally, there is a need for an apparatus that can transcode data between different data formats. Accordingly, there is a need for an apparatus that can store data on network-accessible storage devices and transcode data between formats. The present invention satisfies these needs.

SUMMARY OF THE INVENTION

Embodiments of the present invention include a digital media distribution device that includes an encoder, a decoder, and a transcoder, which transcodes between data formats. The digital media distribution device interfaces with a shared storage device for data storage. An exemplary embodiment of the present invention is a digital media distribution device that includes an encoder, a decoder coupled to the encoder, and a transcoder coupled to the decoder. The encoder is configured to encode input data that is received by the digital media distribution device into a first data format. The decoder is configured to decode output data to be output by the digital media distribution device. The transcoder is configured to convert the encoded input data from the first data format into a second data format. The digital media distribution device is configured to be coupled to a computer network.

In other, more detailed features of the invention, the encoder and decoder are housed within a single electronics rack. The electronics rack includes a hardware slot, and an interface board that is configured to insert into the hardware slot. The interface board supports an interface format selected from the group consisting of SD-SDI, HD-HDI, GSN, uncompressed AES-3, unbalanced BNC, and balanced XLR. Also, the encoder and decoder are remote controllable. In addition, a computer terminal unit is coupled to the encoder and the decoder.

In other, more detailed features of the invention, the encoder and the decoder perform a verification check and report their status to a user before processing data. In addition, the encoder is configured to calculate a peak signal-to-noise ratio value when the encoder and the decoder are coupled in a closed-loop configuration. In addition, the transcoder is implemented in software on a personal computer. Furthermore, the transcoder includes a PCI accelerator board having ASIC accelerators. Also, the transcoder converts between data formats selected from the group consisting of JPEG2000, MPEG-2, minimally ATSC (high definition), DVD elemental bit stream, DVB (625), and 4:2:2.

In other, more detailed features of the invention, the digital media distribution device is configured for wavelet-based tunable compression. Also, the digital media distribution device has a form factor and a user interface that approximate the form factor and the user interface for a video tape recorder. In addition, the digital media distribution device includes a codec and an operating system, and the codec and the operating system can be upgraded by a user. Furthermore, the encoder encodes data at an encoding bit rate, the decoder decodes data at a decoding bit rate, and the encoding bit rate and the decoding bit rate are user definable.

In other, more detailed features of the invention, the digital media distribution device is an internet protocol addressable device. Also, the digital media distribution device is coupled to the computer network, and the digital media distribution device is coupled to a network-accessible storage device via the computer network. Furthermore, the encoder, the decoder, and the transcoder each include cache memory used to compensate for latency associated with accessing the network-accessible storage device. Also, the digital media distribution device is coupled to an asset management system, and the asset management system can determine end of file location information and asset information for the data.

Other features of the invention should become apparent from the following description of the preferred embodiments taken in conjunction with the accompanying drawing, which illustrates, by way of example, the principles of the invention.

BRIEF DESCRIPTION OF THE DRAWINGS

FIG. 1 is a block diagram of a digital media distribution device according to a preferred embodiment.

DETAILED DESCRIPTION OF THE PREFERRED EMBODIMENTS

Referring to FIG. 1, embodiments of the present invention are included in a digital media distribution device ("DMD device") 10 that compresses input data for storage and decompresses stored data to be output from the DMD device. The DMD device includes an encoder 12, which compresses the input data received from an external device (not shown), e.g., film scanner; a decoder 14, which decompresses the data for output while preserving color matrices and properly adjusting the image size; and a transcoder 16, which converts the data between various data formats.

The encoder 12 and decoder 14 are rack-mountable and can be housed within a single electronics rack (not shown), or in two separate electronics racks (not shown) for playback-only or record-only configurations, and can be remotely controlled using various remote control formats, e.g., Sony RS-422 VTR control. The encoder, decoder, and transcoder 16 are coupled, via interface lines 18, 20, and 22, respectively, e.g., fiber or copper Ethernet interfaces, to a computer network 24, e.g., Ethernet. Accordingly, the encoder is coupled to the decoder via the computer network. Also, a computer terminal unit 26 is coupled to both the encoder and the decoder via RS-232 lines 28 that couple to RS-232 ports (not shown) on the encoder and decoder. The computer terminal unit allows an operator to control the decoder and the encoder.

Also, the computer terminal unit can be network assignable so it can be physically separated from the encoder and the decoder.

A server 30, e.g., a New Technology ("NT") server or a Unix box, is coupled to the computer network 24 via a server interface line 32, and a network accessible data storage device 34 is coupled to the server via a storage device interface line 36. The data storage device can be any of the standard storage devices known in the art. While FIG. 1 depicts one server and network storage device, more than one server and more than one network storage device can be coupled to the computer network and accessed by the DMD device 10.

The DMD device 10 is a network addressable device, e.g., an interne protocol ("IP") addressable device, thus the DMD device permits remote access via the computer network 24 for configuration, operation, diagnostics, and upgrades. The DMD device is designed to utilize database standards, e.g. SQL, and thus can interface with a standard database server 30. The operating system ("OS") for the DMD device can be any open and customizable OS, e.g., Linux.

Both the encoder 12 and the decoder 14 each include a front-end module (not shown), a mid-region module (not shown), and a back-end module (not shown). Encoder's front-end module interfaces with the computer network 24 and receives input signals from the computer network. The encoder's front-end module includes slots (not shown) into which various interface cards can be inserted to handle different input formats, e.g., high definition ("HD"), standard definition ("SD"), and gigabyte system network ("GSN"). The encoder transfers the data received by the encoder's front-end module to the encoder's mid-region module where the data is compressed. After the data is compressed, the encoder transfers the compressed data to the encoder's back-end module, which transfers the compressed data via the computer network and the server 30 to the network storage device 34.

The decoder's back-end module (not shown) interfaces with the computer network 24 and receives data from the network storage device 34 via the server 30. Next, the decoder 12 transfers the compressed data from the back-end module to the mid-region module where the compressed data is decompressed. Finally, the decoder transfers the decompressed data from the mid-region module to the decoder's front-end module which outputs the data, e.g., SD or HD video data, to the user based on the user-defined configuration.

Both the encoder 12 and the decoder 14 are of a modular building block configuration, which allows for the expansion of encoder and decoder capability. As mentioned previously, the encoder and the decoder are rack-mountable, each with a maximum foot print of two rack units ("RUs"). The rack space for the combination of all of the encoder modules (not shown) and the decoder modules (not shown) can extend, for example, to a total of six RUs.

Both the encoder's front end module (not shown) and the decoder's front-end module (not shown) include reconfigurable hardware slots into which various interface boards, e.g., Ethernet board including either fiber or copper interfaces, can be installed to handle various input types (encoder) and output types (decoder). Since the interface type for both the encoder's front-end module and decoder's front end module can be reconfigured, the encoder and decoder can be customized to match the desired interface type. In particular, the interface type for both the encoder's front-end module and the decoder's front-end module can be reconfigured to support an SD (e.g., NTSC standard=525 lines or PAL standard=625 lines) serial data input ("SD-SDI") stream, an HD (e.g., 1920 by 1080 interlaced pixels) serial data input ("HD-SDI") stream, or an optical GSN stream.

In one example, the encoder's front-end module (not shown) and/or the decoder's front-end module (not shown) can be configured to include dual 292 HD-SDI interfaces, five audio channels interfaces, and a time code interface. Embodiments that include dual HD-SDI advantageously provide full color, i.e., red, green, blue data ("RGB") at 4:4:4, rather than sub-sampled color, i.e., RGB at 4:2:2, which is provided when the interfaces are single HD-SDI interfaces. In another example, the encoder's front-end module or the decoder's front-end module includes 48 audio channels interfaces. In yet another example, both the encoder's front-end module and the decoder's front-end module are configured with SD-SDI, HD-SDI SMPTE 292, and 8 audio channel interfaces such that both the encoder and the decoder have a combined front-end module bandwidth of 3.5 gigabits per second and a combined back-end module bandwidth of at least 1 gigabit per second.

Furthermore, the slots (not shown) in the encoder's front-end module (not shown) and the decoder's front-end module (not shown) can be configured to include interfaces for encoding/decoding audio data, which can be in various audio formats, e.g., uncompressed AES-3, unbalanced BNC, and balanced XLR. Both the encoder 12 and the decoder 14 can also handle embedded audio in 292 or 601 bit stream configurations. The implemented audio file format should be lossless with a mechanism to sync with the corresponding video format for transcoding and decoding. An example audio format supports a 96 kHz sample rate and a 32-bit depth.

Both the encoder 12 and the decoder 14 include a time code that supports the linear time code ("LTC") and vertical interlaced time code ("VITC") standards, including drop frame/non-drop frame. For the decoder, both an analog timecode and a digital timecode are available over an RS-422 serial port. Also, the decoder supports error concealment, for on-air use, and provides for disabling error concealment, for mastering. The user has the ability to turn the concealment on and off. Also, the decoder supports standard VTR functionality, for example, jog dial playback, pause, and rewind. In addition, the decoder supports the ability to adjust the size, aspect ratio, and resolution of an image.

Before the encoder 12 and the decoder 14 are used, the encoder and the decoder perform a file system performance verification check and report their statuses to the user. Also, the encoder and the decoder report their ability to perform proper encoding and decoding based on the statuses of their boot batteries and the results of bandwidth tests. The boot battery is the internal battery source included in both the encoder and the decoder that is used to power memory devices, e.g., EEPROMs, that hold the boot information for the encoder or decoder. Also, both the encoder and the decoder can perform video/audio diagnostic capability checks such as tone and test pattern reading.

The encoder 12 and the decoder 14 can be coupled in a closed-loop configuration (not shown). In the closed-loop configuration, the encoder can calculate a value of peak signal-to-noise ratio ("PSNR") according to the following equation:

$$PSNR = 20 \log(RMS\ error),$$

where the RMS error is the square root of the squared value of the encoder-decoder system's average error measured by the encoder squared.

The PSNR value is output to the user on the computer terminal unit 26 and can be monitored by the user or a remote device (not shown) and used to determine if the quality of the encoding is sufficient, or if the encoding bit rate needs to be adjusted.

The transcoder 16 is housed within a personal computer 38 and can be implemented as a software module that can run on more than one computer. Furthermore, the transcoder can incorporate a peripheral component interconnect ("PCI") accelerator board (not shown) with Application Specific Integrated Circuit ("ASIC") accelerators for improved performance. The transcoder utilizes a database, e.g., an SQL-compliant database, for job actions, and processes transcoding jobs according to a customizable priority structure. More specifically, the transcoder handles job delegation, queuing, prioritization, delivery, and hand-off. The transcoder delivers transcoded output to the network storage device 34 via the computer network 24.

User interaction with the transcoder 16 is implemented via a graphical user interface ("GUI") and command line interface ("CLI"). Through the GUI, users can select a data file to transcode and submit the job for processing. The GUI is generic, able to run on multiple platforms, and is customizable to support the creation of interfaces for different job functions. The transcoder also is able to accept transcoding commands via a command line interface ("CLI") though a remote shell ("RSH"), which allows for remote login to the transcoder.

The transcoder 16 can transcode between various data formats, e.g., JPEG2000, MPEG-2, minimally ATSC (high definition), DVD elemental bit stream, DVB (625), and 4:2:2, with full user configurability on transcode options. Also, the transcoder allows the user to adjust the bit rates, frame rates, resolution, broadcast format, GOP structures, audio repackaging, and syncing schemes of the data. The transcoder processes intermediate RGB data and add burn-in elements. Also, the transcoder converts different field orders (both lower and upper). The transcoder can output asset recreation instructions ("metadata") so that the transcoded version of the data can be recreated if demanded. The transcoder can first store the transcoded output data to the network storage device 34, and then forward the transcoder's output to another device (not shown), e.g., additional disk storage.

All storage of data for the encoder 12, decoder 14, and transcoder 16, is accomplished using the network storage device 34, which is accessible over the computer network 24 through the server 30. The encoder, decoder, and transcoder all include cache memory (not shown), which is used to compensate for latency associated with accessing the network storage device. The size of the cache memory in each of the encoder, the decoder, and the transcoder is sufficient to prevent lag during high-latency conditions. File systems, e.g., common interne file system (CIFS/SMB) or network file system interface—NFS-V3, are included in the DMD device 10 that support the storage of encoded files to the network storage device. The DMD device can also include a hierarchical storage management ("HSM") system (not shown) via standard HSM protocols, or even Extensible Markup Language ("XML") tags, which control the storage of the encoded data.

Furthermore, the DMD device 10 has the ability to communicate with an asset management system (not shown), which permits the user to track and manage the data ("the asset"). The asset management system can be used to determine the end file location information and asset identification of the data. In one example, an asset management system could be used to locate where a specific take of a scene in a film is stored in the network data storage device 34.

Advantageously, the DMD device 10 according to the present invention, in addition to functioning as a VTR, has a form factor and user interface that is similar to, approximate, that of a VTR. The DMD device can operate either as a stand-alone device or a network-accessible device. When the DMD device is coupled to a computer network 24, the DMD device can benefit from backup servers (not shown) that provide data in the event of a failure of the network data storage device 34. Also, the DMD device advantageously includes an output mechanism that indicates the status and configuration of the encoder 12 and the decoder 14. For example, the DMD device can measure the boot battery value and bandwidth of the encoder and decoder prior to use. When power is applied to the encoder and decoder, the encoder and decoder use their boot battery for initialization purposes, and the encoder and decoder measure the available network bandwidth and characterize the computer network throughput and performance based on the current network bandwidth and usage. This information is output to the user via a monitoring device, e.g., the computer terminal unit 26.

Another advantage of the DMD device 10 is that the codec and OS are upgradeable in both the encoder 12 and decoder 14 since the OS is stored on Flash ROM (not shown) and the codec is implemented using a pin grid array ("PGA")-based architecture (not shown). The codec and the OS can be upgraded in the server mode, where the DMD device checks for updates from a server, via the computer network, and then proceeds to operation. Alternatively, the codec and the OS can be upgraded in the stand alone mode, where updates can be administered through the computer terminal unit 26. Furthermore, the computer terminal unit can communicate with the encoder or decoder in case of boot failures, notifications, or status messages. The encoder or decoder can be instructed, via the computer terminal unit, through command line interface ("CLI") scripts. Also, CLI scripts can be used to control the transcoder.

Advantageously, the DMD device 10 can support the encoding and decoding of data files at bit rates set in user-definable profiles (not shown). The profiles are stored on the server 30 and can be accessed by a remote user when changing the bit rate for a specific input job. The bit rate can change from lossless to lossy, which could be from no degradation to absolute degradation in image quality. Also, the bit rate can be different between the bit rate input to the DMD device and the bit rate output from the DMD device, e.g., if the input bit rate is 10 bits per pixel, the output can vary from 10 bits per pixel (no loss) down to 0.1 bit per pixel (lossy). Furthermore, the digital media distribution device provides for wavelet-based tunable compression, for example, with JPEG2000 data.

The foregoing detailed description of the present invention is provided for purposes of illustration, and it is not intended to be exhaustive or to limit the invention to the particular embodiments disclosed. The embodiments can provide different capabilities and benefits, depending on the configuration used to implement the key features of the invention. Accordingly, the scope of the invention is defined only by the following claims.

The invention claimed is:

1. A digital media distribution (DMD) device comprising:
   an encoder that is configured to receive a video signal solely from an external network, to encode the video signal to generate compressed video data, and to output the compressed video data solely to the external network, in response to control input from a computer terminal;
   a decoder, housed with the encoder in the DMD device and configured to receive the compressed video data solely from the external network, and to decode the compressed video to generate the video signal for output from the DMD device, in response to control input from the computer terminal; and wherein the external network and computer terminal are both external to and separate from the DMD device, and the encoder and decoder are not communicatively coupled to one another except by the external network.

2. The DMD device of claim 1, wherein the encoder and decoder are housed together in at least one electronics rack.

3. The DMD device of claim 1, wherein the encoder is configured to receive input signals from the external network via a reconfigurable hardware slot adapted to support an interface format selected from the group consisting of SD-SDI, HD-HDI, CSN, uncompressed AES-3, unbalanced BNC, and balanced XLR.

4. The DMD device of claim 1, wherein the encoder and the decoder are remotely controllable.

5. The DMD device of claim 1, wherein the encoder performs a file system performance verification check and reports its status before encoding data.

6. The DMD device of claim 1, wherein the encoder is configured to calculate a peak signal-to-noise ratio value when the encoder and the decoder are coupled in a closed-loop configuration.

7. The DMD device of claim 1, wherein the encoder and decoder are configured for wavelet-based tunable compression.

8. The DMD device of claim 1, further comprising an operating system and codec each capable of being upgraded by a user.

9. The DMD device of claim 1, wherein encoding and decoding are performed at bit rates stored in user-definable profiles.

10. The DMD device of claim 1, wherein the encoder and decoder are internet protocol addressable devices.

11. The DMD device of claim 1, wherein the decoder supports standard VTR functionality including at least jog dial playback, pause, and rewind.

12. The DMD device of claim 1, coupled to a transcoder via the external network, the transcoder configured to transcode the compressed video data from a first data format to a second data format.

13. The DMD device of claim 12, wherein the transcoder comprises software operating on a personal computer.

14. The DMD device of claim 12, wherein the transcoder utilizes a database prioritizing transcoding jobs according to a customizable priority structure.

15. The DMD device of claim 12, wherein the transcoder converts between data formats selected from the group consisting of JPEG2000, MPEG-2, minimally ATSC (high definition), DVD elemental bit stream, DVB (625), and 4:2:2.

16. The DMD device of claim 12, wherein the encoder, the decoder, and the transcoder each include cache memory used to compensate for latency associated with communications with the storage device via the external network.

17. The DMD device of claim 1, further comprising a storage device coupled to the DMD device via the external network.

18. The DMD device of claim 17, wherein the storage device receives the compressed video data from the encoder via the external network and stores the compressed video data.

19. The DMD device of claim 18, wherein the decoder receives the compressed video data stored in the storage device from the storage device via the external network.

20. The DMD device of claim 17, further comprising an asset management system, wherein the asset management system can determine end of file location information and asset information for the compressed video data stored in the storage device.

* * * * *